US007878808B1

(12) United States Patent
Stumm et al.

(10) Patent No.: US 7,878,808 B1
(45) Date of Patent: Feb. 1, 2011

(54) MULTIPLE APPLICATION INTERACTIVE TUTORIAL PLAYER

(75) Inventors: Gerd Stumm, Heidelberg (DE); Jack Boers, Rettigheim (DE)

(73) Assignee: SAP AG, Walldorf (DE)

(*) Notice: Subject to any disclaimer, the term of this patent is extended or adjusted under 35 U.S.C. 154(b) by 760 days.

(21) Appl. No.: 10/754,277

(22) Filed: Jan. 8, 2004

Related U.S. Application Data (60) Provisional application No. 60/504,154, filed on Sep. 19, 2003.

(51) Int. Cl.
*G09B 19/00* (2006.01)
*G09B 7/00* (2006.01)
*G09B 3/00* (2006.01)

(52) U.S. Cl. .................. 434/118; 434/308; 434/322; 434/350

(58) Field of Classification Search ............ 434/118, 434/308, 323, 350; 717/113; 715/700–715
See application file for complete search history.

(56) References Cited

U.S. PATENT DOCUMENTS

| 4,772,206 | A | * | 9/1988 | Kerr et al. ............... 434/118 |
| 5,008,853 | A |   | 4/1991 | Bly et al. |
| 5,310,349 | A |   | 5/1994 | Daniels et al. |
| 5,388,993 | A | * | 2/1995 | McKiel et al. ............ 434/118 |
| 5,395,243 | A |   | 3/1995 | Lubin et al. |
| 5,442,759 | A | * | 8/1995 | Chiang et al. .............. 705/1 |
| 5,481,667 | A | * | 1/1996 | Bieniek et al. ............ 715/709 |
| 5,577,186 | A | * | 11/1996 | Mann et al. ............ 715/500.1 |
| 5,584,699 | A |   | 12/1996 | Silver |
| 5,602,982 | A | * | 2/1997 | Judd et al. .............. 715/709 |
| 5,675,802 | A |   | 10/1997 | Allen et al. |
| 5,788,508 | A |   | 8/1998 | Lee et al. |
| 5,802,514 | A |   | 9/1998 | Huber |
| 5,881,315 | A |   | 3/1999 | Cohen |
| 6,011,949 | A |   | 1/2000 | Shimomukai |
| 6,014,134 | A |   | 1/2000 | Bell et al. |
| 6,020,886 | A | * | 2/2000 | Jacober et al. ............ 715/709 |
| 6,091,930 | A |   | 7/2000 | Mortimer et al. |
| 6,099,320 | A |   | 8/2000 | Papadopoulous |
| 6,112,049 | A |   | 8/2000 | Sonnenfeld |

(Continued)

FOREIGN PATENT DOCUMENTS

GB 2373625 A 9/2002

OTHER PUBLICATIONS x.hlp, "Software for faster learning," http://www.xhlp.com/home.cfm, Apr. 2003.

(Continued)

*Primary Examiner*—Xuan M Thai
*Assistant Examiner*—Kang Hu
(74) *Attorney, Agent, or Firm*—Finnegan, Henderson, Farabow, Garrett & Dunner, LLP (57) ABSTRACT

Methods and systems, including computer program products, for playing tutorials. The techniques include receiving a tutorial for a computer program, playing the tutorial using a first player, the first player allowing interaction with the computer program while playing the tutorial, and executing a second player from the first player, the second player simulating operation of the computer program while playing the tutorial. The first player plays the tutorial in a tutorial window that overlaps the application window and that remains on top of the application window.

20 Claims, 6 Drawing Sheets

U.S. PATENT DOCUMENTS

| | | | |
|---|---|---|---|
| 6,134,552 | A | 10/2000 | Fritz et al. |
| 6,148,338 | A | 11/2000 | Lachelt et al. |
| 6,149,438 | A | 11/2000 | Richard et al. |
| 6,149,441 | A | 11/2000 | Pellegrino et al. |
| 6,162,060 | A | 12/2000 | Richard et al. |
| 6,164,974 | A | 12/2000 | Carlile et al. |
| 6,175,841 | B1 | 1/2001 | Loiacono |
| 6,315,572 | B1 | 11/2001 | Owens et al. |
| 6,336,813 | B1 | 1/2002 | Siefert |
| 6,347,333 | B2 | 2/2002 | Eisendrath et al. |
| 6,347,943 | B1 | 2/2002 | Fields et al. |
| 6,368,110 | B1 | 4/2002 | Koenecke et al. |
| 6,370,355 | B1 | 4/2002 | Ceretta et al. |
| 6,381,444 | B1 | 4/2002 | Aggarwal et al. |
| 6,397,036 | B1 | 5/2002 | Thean et al. |
| 6,398,556 | B1 | 6/2002 | Ho et al. |
| 6,430,563 | B1 | 8/2002 | Fritz et al. |
| 6,470,171 | B1 | 10/2002 | Helmick et al. |
| 6,514,085 | B2 | 2/2003 | Slattery et al. |
| 6,527,556 | B1 | 3/2003 | Koskinen |
| 6,587,668 | B1 | 7/2003 | Miller et al. |
| 6,606,480 | B1 | 8/2003 | L'Allier et al. |
| 6,622,003 | B1 | 9/2003 | Denious et al. |
| 6,633,742 | B1 | 10/2003 | Turner et al. |
| 6,643,493 | B2 | 11/2003 | Kilgore |
| RE38,432 | E | 2/2004 | Fai et al. |
| 6,687,485 | B2 * | 2/2004 | Hopkins et al. ............. 434/350 |
| 6,692,256 | B2 * | 2/2004 | Chan et al. .................. 434/118 |
| 6,709,330 | B1 | 3/2004 | Klein et al. |
| 6,729,885 | B2 | 5/2004 | Stuppy et al. |
| 2001/0044728 | A1 | 11/2001 | Freeman et al. |
| 2001/0047310 | A1 | 11/2001 | Russell |
| 2002/0006603 | A1 | 1/2002 | Peterson et al. |
| 2002/0042041 | A1 | 4/2002 | Owens et al. |
| 2002/0061506 | A1 | 5/2002 | Catten et al. |
| 2002/0073063 | A1 | 6/2002 | Faraj |
| 2002/0138841 | A1 | 9/2002 | Ward |
| 2002/0142278 | A1 | 10/2002 | Whitehurst et al. |
| 2002/0187462 | A1 * | 12/2002 | Mariappan .................. 434/350 |
| 2002/0188583 | A1 | 12/2002 | Rukavina et al. |
| 2003/0013073 | A1 | 1/2003 | Duncan et al. |
| 2003/0049593 | A1 | 3/2003 | Parmer et al. |
| 2003/0073063 | A1 | 4/2003 | Dattaray et al. |
| 2003/0073065 | A1 | 4/2003 | Riggs |
| 2003/0082508 | A1 | 5/2003 | Barney |
| 2003/0113700 | A1 | 6/2003 | Simon |
| 2003/0129576 | A1 | 7/2003 | Wood et al. |
| 2003/0151629 | A1 | 8/2003 | Krebs et al. |
| 2003/0152899 | A1 | 8/2003 | Krebs et al. |
| 2003/0152900 | A1 | 8/2003 | Krebs et al. |
| 2003/0152901 | A1 | 8/2003 | Altenhofen et al. |
| 2003/0152902 | A1 | 8/2003 | Altenhofen et al. |
| 2003/0152903 | A1 | 8/2003 | Theilmann |
| 2003/0152904 | A1 | 8/2003 | Doty, Jr. |
| 2003/0152905 | A1 | 8/2003 | Altenhofen et al. |
| 2003/0152906 | A1 | 8/2003 | Krebs et al. |
| 2003/0157470 | A1 | 8/2003 | Altenhofen et al. |
| 2003/0163784 | A1 | 8/2003 | Daniel et al. |
| 2003/0175664 | A1 | 9/2003 | Frangenheim et al. |
| 2003/0175676 | A1 | 9/2003 | Theilmann et al. |
| 2003/0211447 | A1 | 11/2003 | Diesel et al. |
| 2003/0224339 | A1 | 12/2003 | Jain et al. |
| 2004/0081951 | A1 | 4/2004 | Vigue et al. |

OTHER PUBLICATIONS

Global Knowledge Network, Inc., "On Demand Personal Navigator," http://kp.globalknowledge.com/products/od/index.asp , Sep. 2002.

Jörg Siekmann et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al.," Modeling Constructivist Teaching Functionality and Structure in the KBS Hyperbook System," University of Hannover,pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

U.S. Appl. No. 60/201,500, Adams, filed May 3, 2000.

U.S. Appl. No. 60/272,251, Ward, filed Feb. 28, 2001.

U.S. Appl. No. 60/329,088, Riggs, filed Oct. 12, 2001.

U.S. Appl. No. 60/334,714, Diesel, filed Nov. 1, 2001

U.S. Appl. No. 60/400,606, Diesel, filed Aug. 1, 2002.

Hewlett Packard, "HP OpenView Integration Guide for Developers," Jul. 2002, [online], [retrieved from the Internet on Mar. 24, 2004: http://h21007.www.2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wwws.sun.com/software/sunone/wp-spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

* cited by examiner

MULTIPLE APPLICATION INTERACTIVE TUTORIAL PLAYER

CROSS-REFERENCE TO RELATED APPLICATION

This application claims priority to U.S. Provisional Application No. 60/504,154, which was filed on Sep. 19, 2003.

TECHNICAL FIELD

This patent application relates generally to data processing via a digital computer and, more particularly, to managing display of an electronic tutorial.

BACKGROUND

Generally speaking, an electronic tutorial ("tutorial") includes information and associated software that provides a user with guidance on how to complete a task in a computer program ("program") or outside of a computer program. Typically, a tutorial will provide step-by-step instructions for performing the task. For example, a tutorial for use with a program, such as Microsoft® Word®, might cover the task of saving an existing document to a new location. Such a tutorial might instruct the user, e.g., to go to a "File" pull-down menu of an open document, select a "Save As" menu item, and, in a resulting dialog box, specify where the document is to be saved and a new name (if desired) for the document. Another example of a task that can be covered by a tutorial is changing an ink cartridge in an ink jet printer.

Software may be used to run the tutorial. This software, called a tutorial player (or simply "player") formats and displays information from the tutorial on-screen so that a user can view the information in context.

SUMMARY

In one aspect, the invention is directed to a computer program product, tangibly embodied in an information carrier, for playing tutorials. The computer program product is operable to cause a data processing apparatus to perform operations that include receiving a tutorial for a computer program, playing the tutorial using a first player, and executing a second player from the first player. The first player allows interaction with the computer program while playing the tutorial. The second player simulates operation of the computer program while playing the tutorial. By providing first and second players that operate differently, the invention allows the user to choose how best to learn via the tutorial. This flexibility is enhanced by allowing users to switch from the second player to the first player and vice versa.

The foregoing aspect may include one or more of the following features.

The computer program may run in an application window. Playing the tutorial using the first player may include running the tutorial in a tutorial window that is smaller than the application window, and/or running the tutorial in a tutorial window that overlaps the application window and that remains on top of the application window. The tutorial may include a screen image associated with the computer program. Playing the tutorial using the first player may include displaying a cropped version of the screen image; running the tutorial on a client computer without installing the tutorial on the client computer; and/or displaying a context indicator that indicates which portion of the tutorial is currently being played.

The first player may run in a Web browser on a client computer, and the second player may be installed locally on the client computer. Executing the second player from the first player may include accessing the second player from the first player through a browser plug-in installed in the Web browser. Executing the second player from the first player may include displaying a link to the second player in the first player, and receiving input selecting the link.

In general, in another aspect, the invention is directed to a method for playing tutorials. The method includes receiving a tutorial for a process, playing the tutorial using a first player, the first player allowing interaction with the process while playing the tutorial, and playing the tutorial using a second player, the second player simulating operation of the process while playing the tutorial. The second player is executed via the first player, or the first player is executed via the second player. This aspect may include one or more of the following features.

The process may be implemented via a computer program that runs in an application window. Playing the tutorial using the first player may include running the tutorial in a tutorial window that is smaller than the application window, and/or running the tutorial in a tutorial window that overlaps the application window and that remains on top of the application window. The tutorial may include a screen image associated with the process. Playing the tutorial using the first player may include displaying a cropped version of the screen image; running the tutorial on a client computer without installing the tutorial on the client computer; and/or displaying a context indicator that indicates a portion of the tutorial is currently being played.

The first player may run in a Web browser on a client computer, and the second player may be installed locally on the client computer. Executing the second player from the first player may include accessing the second player from the first player through a browser plug-in installed in the Web browser. Executing the second player from the first player may include displaying a link to the second player in the first player, and receiving input selecting the link.

In general, in another aspect, the invention is directed to a system that includes a server to host a Web page providing access to a first player. The first player runs a tutorial program for a process concurrently with the process. The system may also include a client computer to access the Web page and to run the first player. The client computer stores a second player that simulates the process while running the tutorial program. The first player is accessible via the second player and/or the second player is accessible via the first player.

In the foregoing aspects, the process may include a mechanical component. Also, accessing the second player from the first player may include accessing the second player from the first player through a browser plug-in installed in the Web browser Other feature and advantages are illustrated below in the detailed description and the drawings.

BRIEF DESCRIPTION OF THE DRAWINGS

Like reference numbers in different figures indicate like elements.

DETAILED DESCRIPTION

Figure 1:
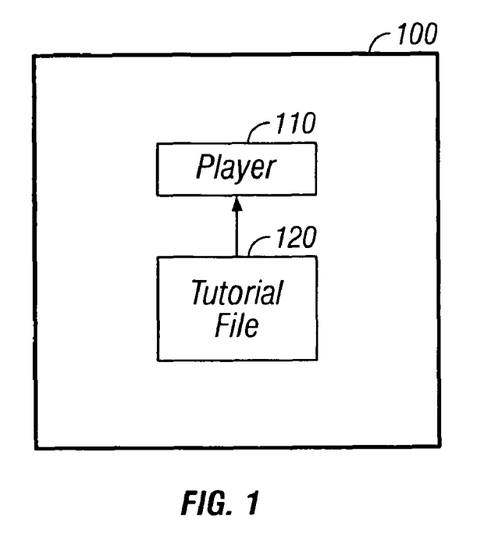
FIG. 1 is a block diagram of an electronic tutorial containing a player and tutorial file(s).

As shown in FIG. 1, a tutorial 100 includes a player 110 for making tutorial contents (i.e., instructions provided via the tutorial) available to a user, and one or more tutorial file(s) 120 for storing the tutorial contents in a format that is executable by player 110. Tutorial 100 may be stored on any type of device that is capable of performing the functions described herein. Examples of such devices include, but are not limited to, a general or special-purpose computer, a personal computer ("PC"), a workstation, a server, a laptop, a Web-enabled telephone, a Web-enabled personal digital assistant ("PDA"), a Web server, and an interactive television set. Such devices may incorporate any number of components, and/or peripherals, such as processors, memory/storage devices, input devices, output devices, and/or interfaces.

Tutorial file(s) 120, as noted above, may include one or more files; however, will be referred to in the plural. Tutorial files 120 include graphics that display screen images of the computer program for which the tutorial is being run. (The computer program for which the tutorial is being run will henceforth be referred to as the "tutored program".) These screen images may comprise screens displayed by the tutored program during its operation. Specifically, the screen images may depict visual states of the tutored program during the execution of one or more steps in the tutored program. Some of these steps may comprise user interaction with one or more program controls (e.g., text input fields, radio buttons, pull-down menus, and tables) displayed in an application window of the tutored program. The screen images can be used to provide a user with visual guidance as to what action(s) the user should perform in a given circumstance.

Tutorial files 120 also may include instruction text. The instruction text provides guidance in a textual format. The text may instruct a user how to perform a given task, such as how to operate pull-down menus in a windowing operating system. The instruction text may, or may not, be associated with corresponding graphics.

Player 110 is software that uses the contents of tutorial files 120 to play a tutorial for the tutored program. Player 110 plays the tutorial in a manner that allows a user of the tutored program to work in the tutored program and to view the tutorial at the same time. Player 110 is operable in either a graphical mode or a textual mode. In the graphical mode, player 110 retrieves appropriate graphics from tutorial files 120 and displays such graphics at an appropriate time. In a textual mode, player 110 retrieves appropriate text from tutorial files 120 and displays such text at an appropriate time. In alternative embodiments, player 110 may play both text and graphics at the same time or may alternate between the two.

The text and graphics stored in tutorial files 120 may be stored in a specific sequence that corresponds, e.g., to a particular process being taught by the tutorial. Player 110 therefore may retrieve appropriate graphics and/or text for a process in the sequence specified by tutorial files 120. In other embodiments, retrieval may be more interactive. For example, the user may be prompted for input regarding text and/or graphics to be retrieved.

Figure 2:
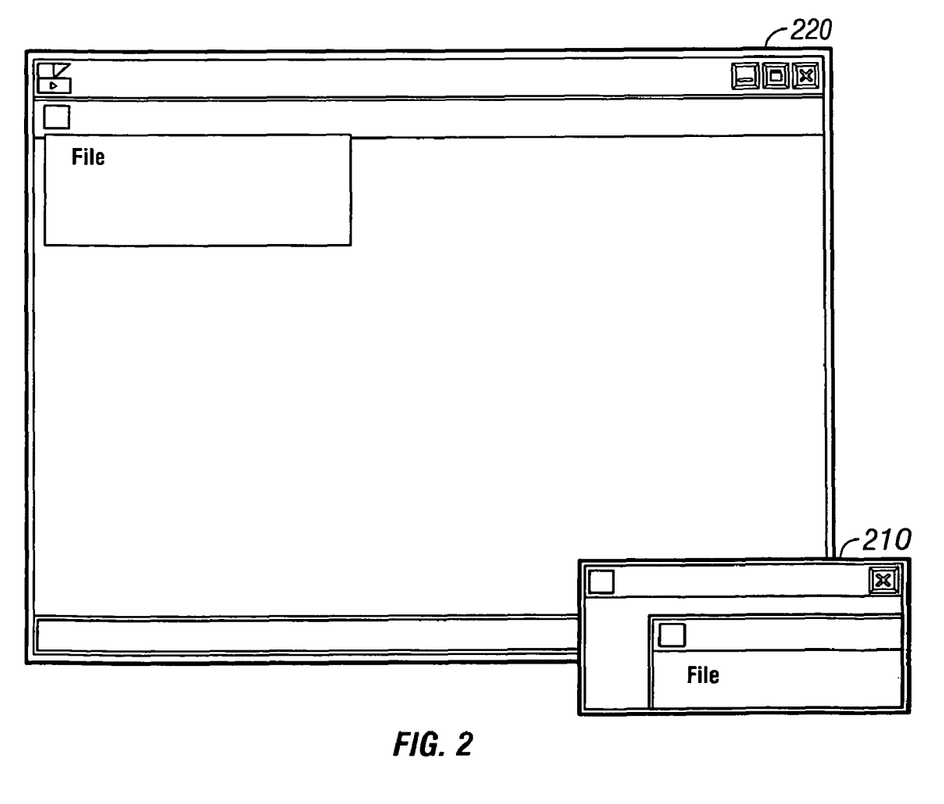
FIG. 2 is an example of a player window associated with the electronic tutorial and an application window associated with the tutored program.

Referring to FIG. 2, player 110 plays the tutorial in a relatively small player window 210, while the tutored program runs concurrently (e.g., in parallel) in a separate application window 220. This type of display enables both the player window and the application window to be viewed at the same time with little or no overlap of the two windows. To the extent that the windows do overlap, as is the case in FIG. 2, player 110 can keep player window 210 in the foreground, even when focus is on the application window.

Rather than playing a full version of the tutorial, player 110 can play a truncated version of the tutorial, which generally is smaller than the full version and thus requires less space to display. For example, rather than displaying a full screen image from tutorial files 120, player 110 can crop the full screen image to produce one or more cropped images, and display the resulting cropped image(s) (instead of the full image). The amount of cropping may be set to roughly match a size of player window 210. In some embodiments, the amount of cropping may be set manually (e.g., by a user) or automatically (e.g., by detecting the size of player window 210 and setting the amount of cropping accordingly).

Figure 3A:
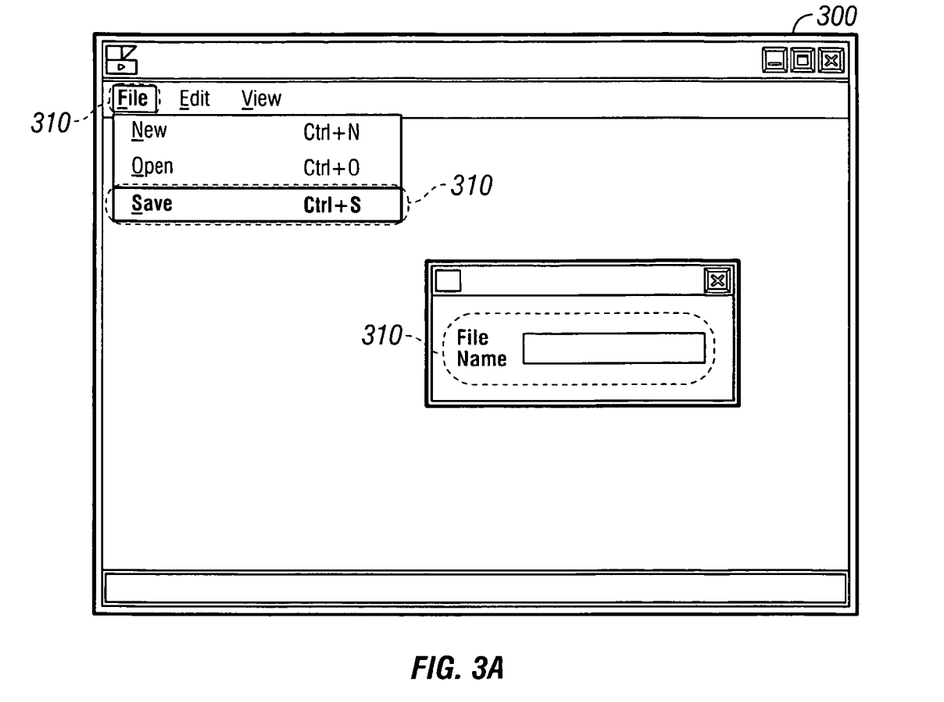
FIG. 3A is an example of a screen image associated with the electronic tutorial.
Figure 3B:
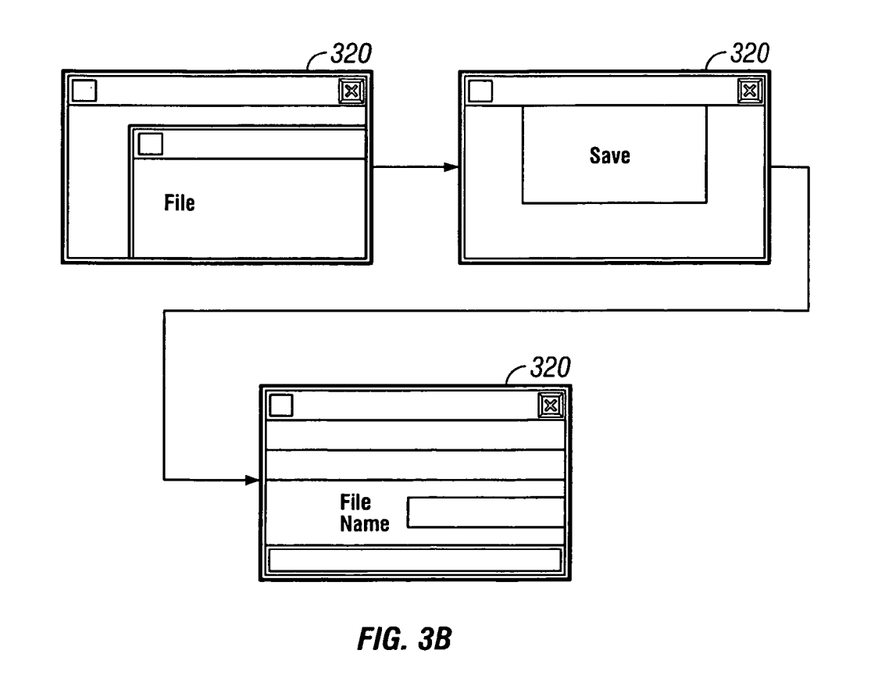
FIG. 3B is an example of cropped screen images associated with the electronic tutorial.

Referring to FIG. 3A, player 110 can perform image cropping using information in a tutorial file 120 that identifies one or more interaction areas 310 on a screen image 300. Interaction areas 310 correspond to areas of an application window that are affected by user interaction Examples of interaction areas include, but are not limited to, areas of the application window where the user clicks on a button or enters data. As shown in FIG. 3B, by default, each cropped image 320 surrounds an interaction area. Areas that do not constitute interaction areas do not include cropped images. In one embodiment, cropping positions can be changed using authoring tools, which are described below.

Figure 4A:
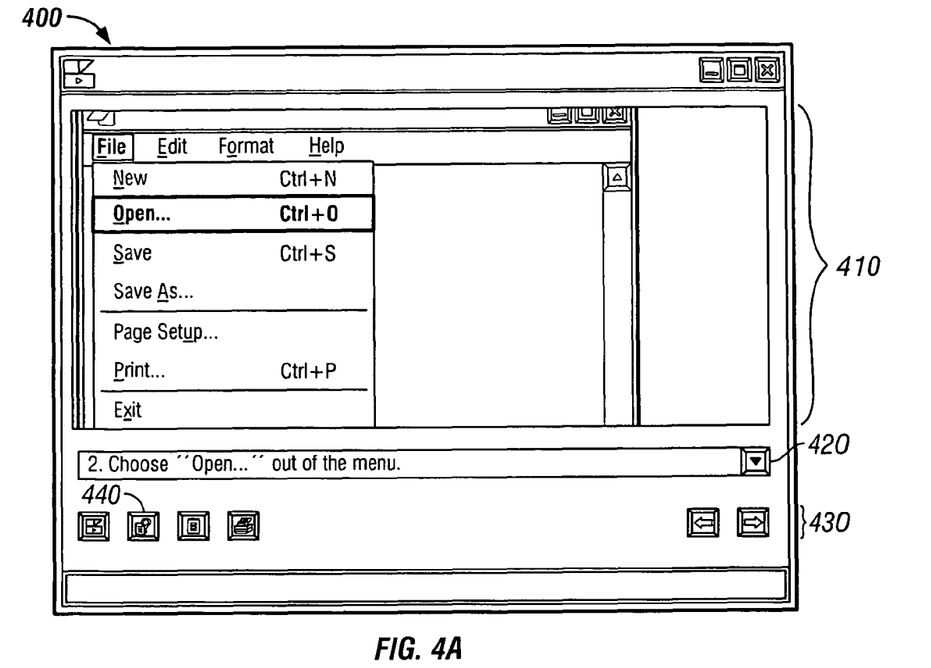
FIG. 4A is an example of the player running in a graphical mode.
Figure 4B:
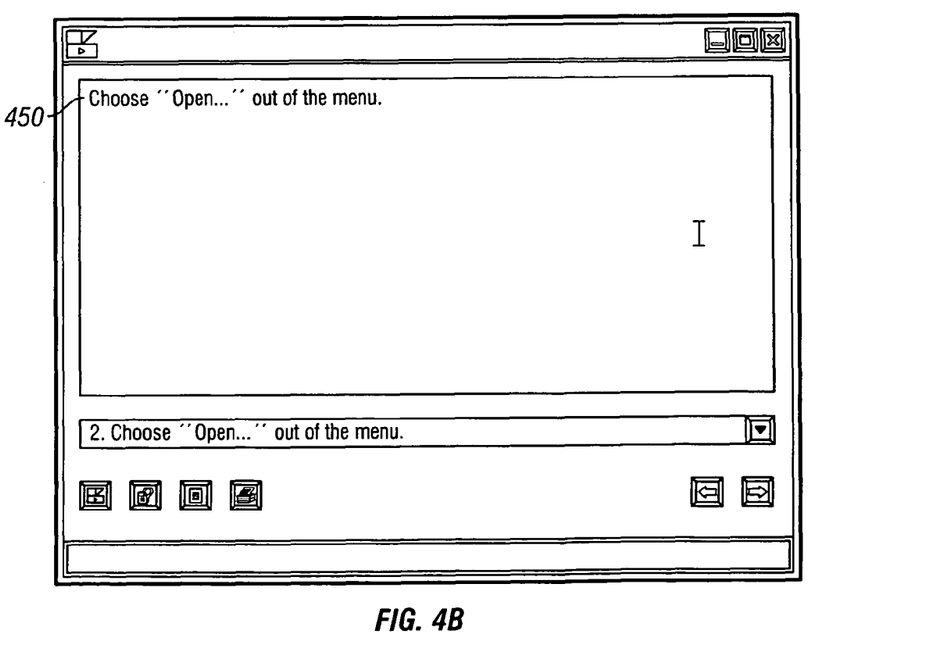
FIG. 4B is an example of the player running in textual mode.

Player 110 may display cropped images in temporal sequence. For example, each displayed image may illustrate a step in a sequence of steps (e.g., a process) being taught through the tutorial. To help orient the user, player 110 may also display context information that identifies a current step and its position relative to an entire sequence of steps being taught in the tutorial. This is illustrated by the representative user interface 400 shown in FIG. 4A. User interface 400 includes a display window 410, a context indicator 420, navigation buttons 430, and a toggle button 440. Display window 410 displays cropped image(s) corresponding to a current step being taught by the tutorial. Context indicator 420 provides the name of the current step and a numerical identifier identifying the position of the current step relative to the entire sequence of steps. Alternatively, the context indicator can display a list of all steps in the sequence, with the current step marked (e.g., highlighted). Navigation buttons 430 can be used to advance forward or backward through the sequence of steps taught by the tutorial. When a new step is selected, the contents of display window 410 changes accordingly. Toggle button 440 can be used to switch between different display modes, including the graphical mode shown in FIG. 4A and a textual mode shown in FIG. 4B. In the textual mode, the display window displays instruction text rather than a screen image.

Authoring Tools

Figure 5:
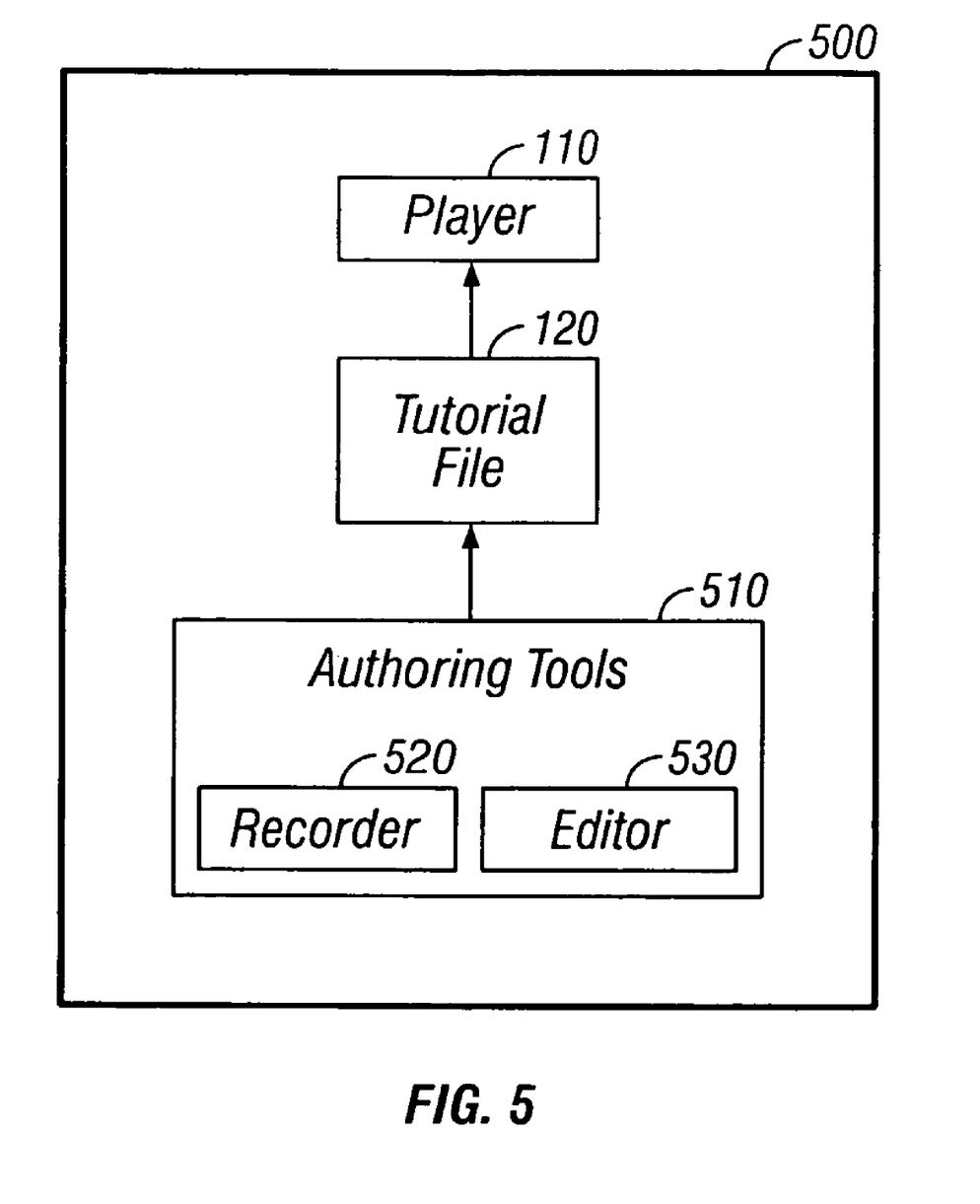
FIG. 5 is a block diagram of an implementation of the electronic tutorial of FIG. 1.

Referring to FIG. 5, in one embodiment 500, tutorial software 500 includes one or more authoring tools 510. Authoring tools 510 comprise software that is used to create and edit tutorial files 120. In this embodiment, authoring tools 510 can create a tutorial file for any 32-bit Microsoft Windows® application; however, the invention is not limited as such. Authoring tools 510 may include, but are not limited to, a recorder 520 and an editor 530.

Recorder 520 may be used to create a tutorial for the tutored program. The process employed by recorder 520 to create the tutorial involves recording user interaction with (e.g., manipulation of) program controls during execution of a tutored program. These user interactions with the program controls constitute steps that are taught by the tutorial. By way of example, recorded user interactions can include, but are not limited to, right/left click, double-click, data entry, and click-and-drag actions performed by the user. Recorder 520 may record the user interactions graphically, textually, or both graphically and textually.

In this regard, recorder 520 may record one or more screen images that depict visual state(s) of application windows of the tutored program during user interaction with the tutored program. Ideally, each visual state/screen image corresponds to a step in a process to be taught by the tutorial. Recorder 520 marks the interaction areas of the recorded images accordingly. Recorder 520 also associates instruction text with each step. The instruction text provides users with a textual explanation of user action(s) required for the recorded step. The instruction text is generated based on templates in combination with user input. Recorder 520 stores the recorded screen images, interaction area positions, and instruction text in tutorial files 120.

Following its creation (e.g., via recorder 520), a tutorial file can be played directly or it can be edited before being played. Editor 530 (FIG. 5) may be used to edit the contents of a tutorial file. For example, editor 530 may be used to modify the content or the size of screen images and/or to revise instruction text in the tutorial file. Other types of editing not specifically described herein may also be performed via editor 530.

Figure 6:
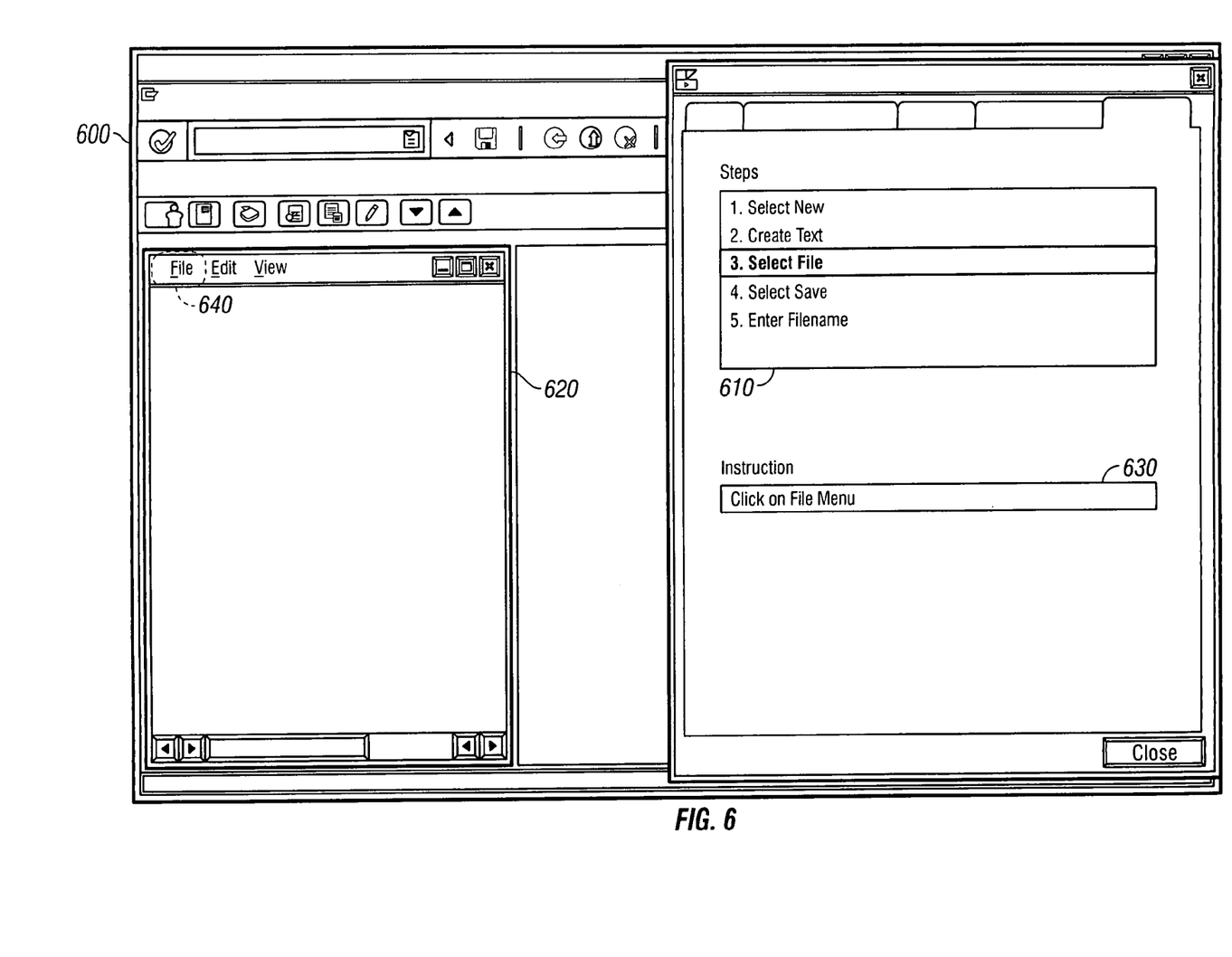
FIG. 6 is an example of an editor associated with the electronic tutorial.

As shown in FIG. 6, authors can view the contents of a tutorial file via an editor screen 600. Editor screen 600 displays a list of the steps 610 for performing a process associated with a tutored program, along with a corresponding screen image 620 and instruction text 630 for a given step. A cropping frame 640 for the interaction area associated with a given step is superimposed on top of the displayed screen image 620. By default, the cropping frame is positioned to surround the interaction area. This default position can be repositioned by dragging and dropping the cropping frame to a new position.

Multiple Players

Figure 7:
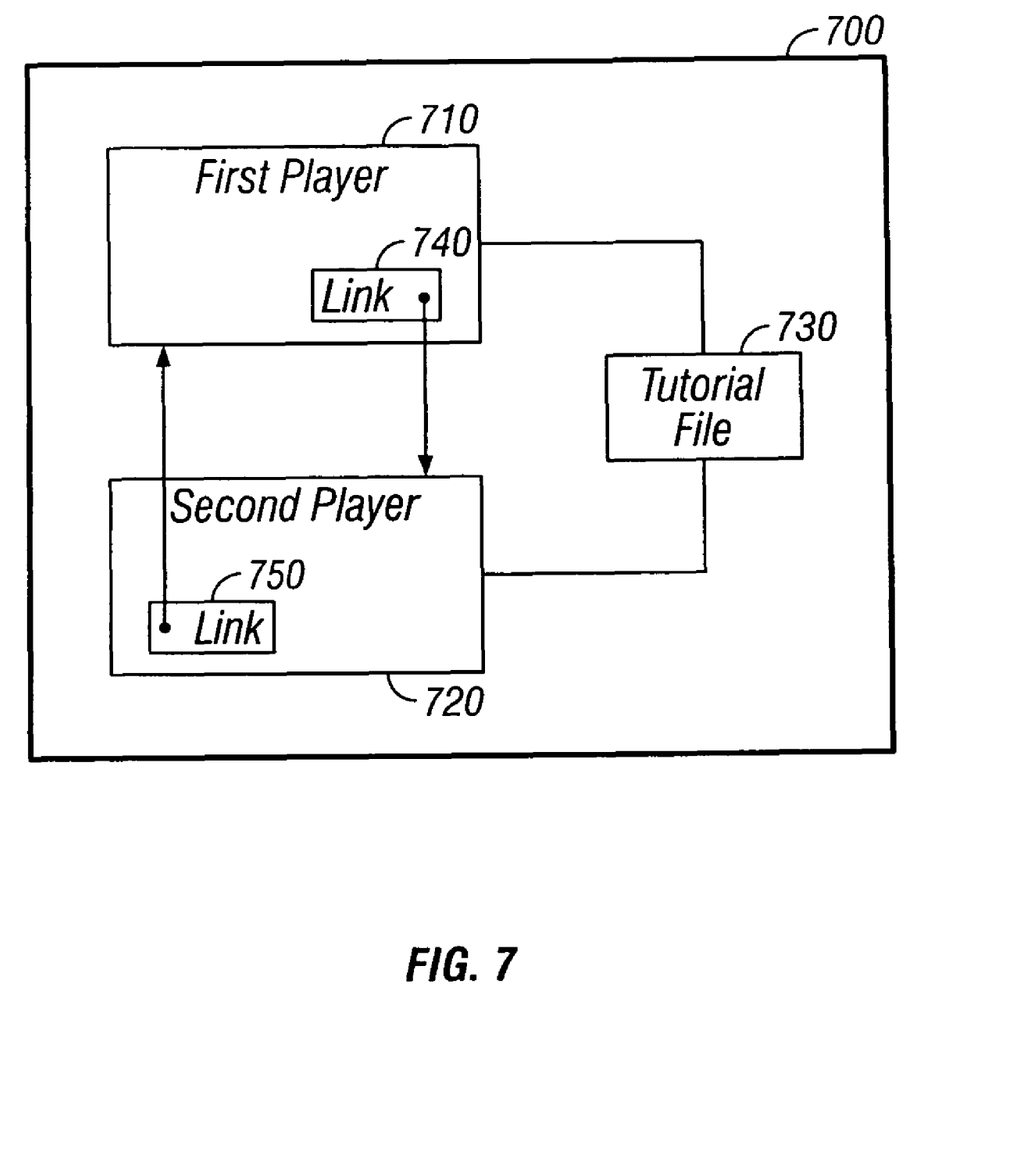
FIG. 7 is a block diagram of an implementation of the electronic tutorial of FIG. 1.

In one embodiment 700, which is shown in FIG. 7, the tutorial system includes two (or more) players 710, 720. Both players use the same tutorial files 730, but play the tutorial differently and for different purposes. First player 710 may be accessed via a Web server and run in a Web browser on a client computer. Second player 720 may be installed locally, i.e., on the client computer, and run locally without requiring access to the Web server. The tutorial files may be stored locally on the client computer, on the Web server, or in both locations.

The first 710 of the two players may be used primarily as a performance support tool and, therefore, may run in parallel with the tutored program. Thus, the first player plays the tutorial in the manner described above with respect to player 110.

The second 720 of the two players may be used primarily as a training tool and, therefore, may run independently of the tutored program. That is, the second player may be run without concurrently running the tutored program. The second player may use the tutorial files to provide a simulated environment in which users can perform steps associated with the tutored program directly in the player as if the player were the tutored program. Thus, users can click on various interaction areas of screen images, and see the screen images change to reflect the results of their interaction. To implement these features, the tutorial files may include code that simulates operation of the tutored program, including receiving user inputs and responding thereto. This code may be "stand-alone" code in the tutorial files or it may include "calls" to the actual computer program, which can be run to assist in the simulation.

In one embodiment, first player 710 is an application (i.e., a computer program) that runs in a Web browser on a client computer and the tutorial files 120 are stored on a Web server. For example, the first player can be implemented as a Java applet. When a Web page (not shown) from the Web server containing the first player is loaded into the Web browser, first player 710 may appear as a button in the Web page. The user can start the first player by clicking on the button. To play a tutorial, first player 710 may create a player window, download the tutorial file from the Web server, for example, by making an HTTP (Hypertext Transfer Protocol) request for the file, and run the tutorial using the tutorial file.

The Web page that hosts first player 710 can also cause a browser plug-in (e.g., a Netscape® plug-in or a Microsoft® ActiveX control) to be installed. Once installed, the browser plug-in allows first player 710 to perform certain functions, such as functions that allow the player window to stay on top of the application window. The browser plug-in also allows the first player to communicate with second player 720, which can be installed as a local program on the client computer. As shown in FIG. 7, first player 710 may display a button or link 740 which, when selected, starts execution of second player 720. Similarly, the second player may display a button or link 750 for starting the first player.

To start the second player 720 from first player 710, first player 710 may use Java code (JSObject class code) in the browser that allows JavaScript code to be executed in the browser. Via this technique, first player 710 can communicate with second player 720 using the browser plug-in noted above.

The ability of first player 710 to access second player 720 enables a user of the tutored program to switch between two different forms of instruction, i.e., instruction while running the tutored program described above with respect to the first player, or instruction while simulating the tutored program described above with respect to the second player. For example, suppose a user of the tutored program needs instruction regarding some aspect of the tutored program. In this case, the user can run the first player to play a condensed version of the tutorial. In this way, the first player acts as an on-line help tool for the tutored program. If, during use of the first player, the user desires more comprehensive instruction, the user can execute the second player directly from the first player. The second player then begins playing a full version of the tutorial that is interactive and simulates operation of the tutored program. Once the user is comfortable working with the simulated program, the user can then resume working with the "live" tutored program. Switching from second player 720 to first player 710 is implemented, and performed, in the same manner as switching from first player 710 to second player 720.

It is noted that second player 720 can be accessed first, i.e., second player 720 need not be accessed via first player 710.

Hardware And Software

The tutorial players described herein can be implemented in digital electronic circuitry, or in computer hardware, firmware, software, or in combinations of them. The tutorial players can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the tutorial players can be performed by one or more programmable processors executing a computer program to perform specific functions by operating on input data and generating output. Method steps can also be performed by, and apparatus for implementing the tutorial players can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the tutorial players can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The tutorial players can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the tutorial players, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The tutorial players have been described in terms of particular embodiments. Other embodiments are within the scope of the following claims. For example, steps described herein can be performed in a different order to achieve desirable results. Furthermore, the tutorial players have been described in the context of a computer program (e.g., a computer-implemented process); however, as noted above, their use extends beyond the data processing realm. That is, the tutorial player can be used to instruct a user on how to perform a mechanical process or a process that involves both mechanics and computer interactions.

What is claimed is:

1. A computer program product, tangibly embodied in a non-transitory computer-readable storage medium, for playing tutorials, the computer program product being operable to cause a data processing apparatus to perform operations comprising:

receiving a tutorial for a computer program, the tutorial storing screen images of the computer program for guiding a user to perform tutorial steps;

playing the tutorial using a first player, the first player displaying the stored screen images, and allowing interaction with the computer program while playing the tutorial, wherein the interaction comprises an ability to modify data of the computer program; and executing a second player from the first player, the second player being a different application from the first player, the second player:

playing the tutorial, displaying the stored screen images, providing a simulated program environment, within the stored screen images, corresponding to the computer program, and allowing a user to perform steps in the simulated program environment of the second player while playing the tutorial, wherein results of the tutorial steps cannot modify the data of the computer program;

wherein:

the computer program runs in an application window;

playing the tutorial using the first player comprises running the tutorial in a tutorial window that overlaps the application window and that remains on top of the application window; and the tutorial steps performed by the user in the simulated program environment of the second player are the same tutorial steps that can be performed by the user when interacting directly with the computer program.

2. The computer program product of claim 1, wherein:

playing the tutorial using the first player comprises running the tutorial in a tutorial window that is smaller than the application window.

3. The computer program product of claim 1, wherein:

the screen images comprise interaction areas, wherein the interaction areas are areas of the screen images that are selectable by the user;

the tutorial comprises cropping information to identify the interaction areas; and playing the tutorial using the first player comprises cropping the screen areas into the interaction areas using the cropping information, and displaying the cropped screen areas.

4. The computer program product of claim 1, further comprising:
   executing the first player from the second player.

5. The computer program product of claim 1, wherein:
   playing the tutorial using the first player includes displaying a context indicator that indicates which portion of the tutorial is currently being played.

6. The computer program product of claim 1, wherein:
   the first player runs in a Web browser on a client computer; and
   the second player is installed locally on the client computer.

7. The computer program product of claim 6, wherein executing the second player from the first player comprises accessing the second player from the first player through a browser plug-in installed in the Web browser.

8. The computer program product of claim 1, wherein executing the second player from the first player comprises:
   displaying a link to the second player in the first player; and
   receiving input selecting the link.

9. The computer program product of claim 1, wherein the first player runs concurrently with the computer program, and the second player does not run concurrently with the computer program.

10. A computer-implemented method for playing tutorials, comprising:
   receiving a tutorial for a computer program, the tutorial storing screen images of the computer program for guiding a user to perform tutorial steps;
   playing, using a processor, the tutorial using a first player, the first player displaying the stored screen images, and allowing interaction with the computer program while playing the tutorial, wherein the interaction comprises an ability to modify data of the computer program; and
   playing the tutorial using a second player and displaying the stored screen images, the second player being a different application from the first player, providing a simulated program environment, within the stored screen images, corresponding to the computer program, and allowing a user to perform tutorial steps associated with the computer program in the simulated program environment of the second player while the second player is playing the tutorial, wherein results of the tutorial steps cannot modify the data of the computer program;
   wherein:
   the computer program runs in an application window;
   playing the tutorial using the first player comprises running the tutorial in a tutorial window that overlaps the application window and that remains on top of the application window;
   the tutorial steps performed by the user in the simulated program environment of the second player are the same tutorial steps that can be performed by the user when interacting directly with the computer program; and
   further wherein the second player is executed via the first player, or the first player is executed via the second player.

11. The method of claim 10, wherein:
   playing the tutorial using the first player comprises running the tutorial in a tutorial window that is smaller than the application window.

12. The method of claim 10, wherein:
   the screen images comprise interaction areas, wherein the interaction areas are areas of the screen images that are selectable by the user;
   the tutorial comprises cropping information to identify the interaction areas; and
   playing the tutorial using the first player comprises cropping the screen areas into the interaction areas using the cropping information, and displaying the cropped screen areas.

13. The method of claim 10, wherein:
   playing the tutorial using the first player includes displaying a context indicator that indicates a portion of the tutorial is currently being played.

14. The method of claim 10, wherein:
   the first player runs in a Web browser on a client computer; and
   the second player is installed locally on the client computer.

15. The method of claim 14, wherein executing the second player from the first player includes accessing the second player from the first player through a browser plug-in installed in the Web browser.

16. The method of claim 10, wherein executing the second player from the first player comprises:
   displaying a link to the second player in the first player; and
   receiving input selecting the link.

17. The method of claim 10, wherein the first player runs concurrently with the process, and the second player does not run concurrently with the process.

18. A system comprising:
   a server to host a Web page providing access to a first player, the first player playing a tutorial program for a process concurrently with the process, wherein the tutorial program stores screen images of the process for guiding a user to perform tutorial steps, and wherein the playing comprises displaying the stored screen image, allowing interaction with the process while playing the tutorial, and providing an ability to modify data of the process; and
   a client computer to access the Web page and to run the first player, the client computer storing a second player, the second player being a different application from the first player, playing the tutorial and displaying the stored screen images, providing a simulated process environment, within the stored screen images, corresponding to the process, and allowing a user to perform tutorial steps associated with the simulated process environment of the process in the second player while the second player is playing the tutorial program, wherein results of the tutorial steps cannot modify the data of the process;
   wherein:
   the process runs in an application window;
   playing the tutorial using the first player comprises running the tutorial in a tutorial window that overlaps the application window and that remains on top of the application window;
   the tutorial steps performed by the user in the simulated process environment of the second player are the same tutorial steps that can be performed by the user when interacting directly with the process; and
   the first player is accessible via the second player or the second player is accessible via the first player.

19. The system of claim 18, wherein the process includes a mechanical component.

20. The system of claim 18, wherein accessing the second player from the first player includes accessing the second player from the first player through a browser plug-in installed in the Web browser.

* * * * *